United States Patent [19]

Holleck

[11] 4,327,158

[45] Apr. 27, 1982

[54] METAL/GAS BATTERY

[75] Inventor: Gerhard L. Holleck, Wayland, Mass.

[73] Assignee: EIC Laboratories, Inc., Newton, Mass.

[21] Appl. No.: 178,523

[22] Filed: Aug. 15, 1980

[51] Int. Cl.³ .......................................... H01M 12/06
[52] U.S. Cl. ..................................... 429/101; 429/155
[58] Field of Search .................... 429/101, 155, 27, 29

[56] References Cited

U.S. PATENT DOCUMENTS

| 594,313 | 11/1893 | Ashley | 429/155 |
|---|---|---|---|
| 770,277 | 9/1904 | Fiedler | 429/155 |
| 3,975,210 | 8/1976 | Warnock | 136/86 A |
| 4,098,962 | 7/1978 | Dennison | 429/101 |
| 4,115,630 | 9/1978 | Ommering et al. | 429/101 |
| 4,127,703 | 11/1978 | Holleck | 429/57 |

FOREIGN PATENT DOCUMENTS 55043 6/1951 France ................................. 429/155

Primary Examiner—Donald L. Walton

[57] ABSTRACT

Metal/gas battery featuring a sealed pressure vessel containing a plurality of electrode stacks encased in hydrophobic cups having a gap between them.

9 Claims, 3 Drawing Figures

4,327,158

METAL/GAS BATTERY

BACKGROUND OF THE INVENTION

This invention relates to metal/gas batteries.

Metal/gas batteries commonly comprise stacks of alternating pairs of metal and gas electrodes separated by electrolyte-saturated matrixes, all encased in a pressure vessel containing gas under pressure. Gas diffuses through a porous layer adjacent each electrode pair to reach the anode, where the discharge mode anode reaction occurs in equilibrium with the simultaneous discharge mode cathode reaction.

Metal/gas batteries, e.g., nickle/hydrogen batteries, having multi-cell arrays are described in Holleck U.S. Pat. No. 4,127,703, hereby incorporated by reference, and in Warnock U.S. Pat. No. 3,975,210. The Warnock patent discloses a pressure vessel containing a plurality of stacks of electrode pairs. Each stack of annular disc-shaped electrodes is completely encased in plastic, so that a common central channel is formed; inner Teflon windows in each stack provide for free gas and heat communication among all stacks. Stacks are electrically connected by means of contact points along the channel length.

SUMMARY OF THE INVENTION

My invention provides a metal/gas battery featuring a pressure vessel containing gas under pressure, and, within the pressure vessel, a plurality of electrode stacks. Each stack is contained in a cup having a bottom portion and an uninterrupted side wall continuous with the bottom portion.

Cups are stacked such that a gap is formed between adjacent cups. The cup surfaces along that gap are hydrophobic and the gap is small enough so that electrolyte bridging, which would cause current shorting, is effectively inhibited. At the same time, the gap is large enough to allow gas from the pressure vessel to reach all of the stacks.

In preferred embodiments, the gap is formed either between a pair of cups wherein the lower cup of the pair is provided with a cover having a hole in it, or it is formed by an area of non-sealing overlap between adjacent cups.

DESCRIPTION OF THE PREFERRED EMBODIMENT

We turn now to the description of a preferred embodiment, after first briefly describing the drawings.

Drawings

STRUCTURE

Figure 1:
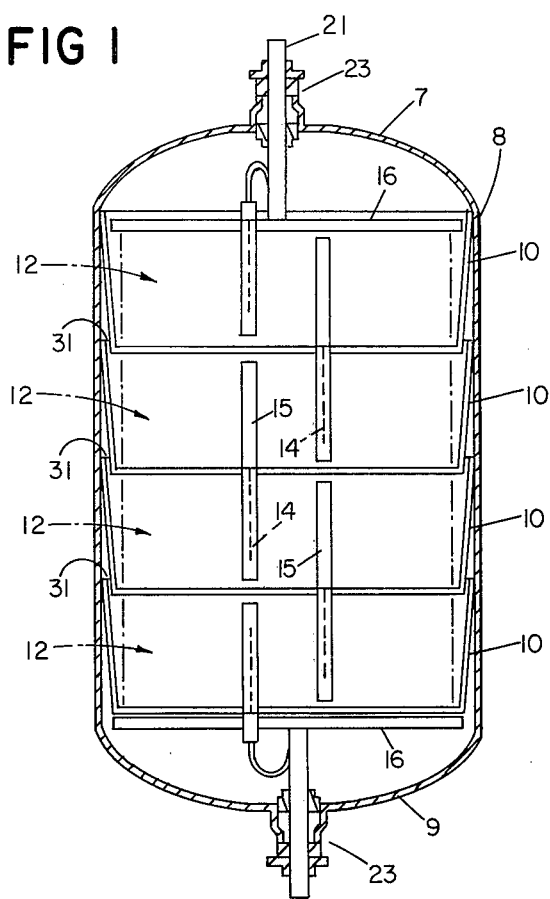
FIG. 1 is a diagrammatic side sectional view of a preferred embodiment.

There is shown in FIG. 1 a diagrammatic representation of a nickle/hydrogen battery comprising a Teflon-lined cylindrical pressure vessel 8, having elliptical ends 9, encasing a plurality of annular disc-shaped electrode stacks 12, and containing hydrogen under a pressure of 20 atmospheres.

Each stack is contained in a topless, frustum-shaped hydrophobic plastic (Teflon) cup 10, the outer surface of the bottom of each of which rests on the top of the stack below it. The size and shape of the cups, and the thickness of the stacks, are such that, between each cup and the cup below it, there is an area of non-sealing overlap wherein the gap 31 between cups is large enough to allow hydrogen from the pressure vessel to enter the stacks but small enough to inhibit electrolyte bridging between stacks.

The stacks are pressed together by end pressure plates 16, on which pressure is exerted by the terminal bars 21 via Belleville washers (not shown). An adjusting mechanism 23 outside the pressure vessel allows adjustment of the pressure on the plates.

Figure 2:
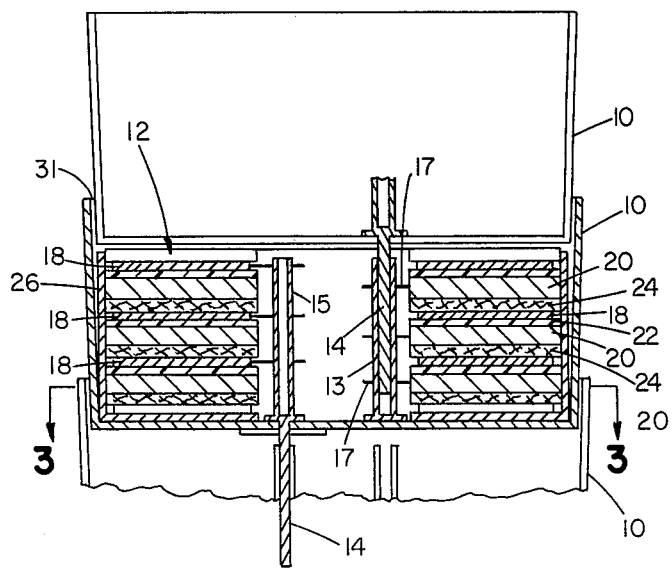
FIG. 2 is a diagrammatic side sectional view of a single electrode stack of said embodiment.
Figure 3:
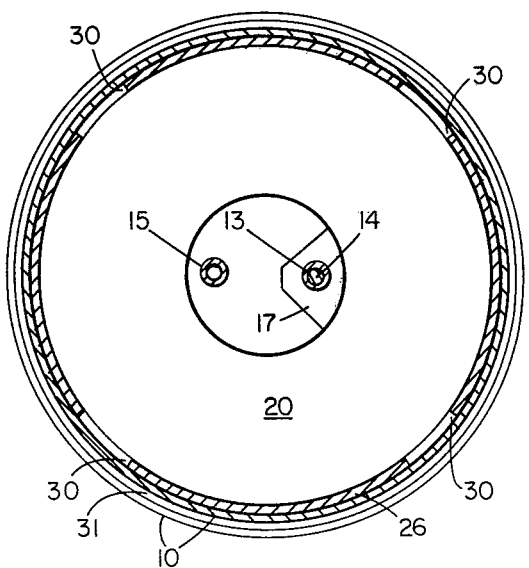
FIG. 3 is a diagrammatic cross-sectional view of said electrode stack.

There is shown in FIG. 2 a diagrammatic representation of an electrode stack enclosed in Teflon cup 10 and comprising a plurality of alternating 3.5 inch diameter, 5 mil thick Teflon-bonded platinum hydrogen electrodes (anodes) 18 and 3.5 inch diameter, 30 ml thick sinter plaque NiOOH electrodes (cathodes) 20; each cathode contains 10 mg $Pt/cm^2$. Each cathode/anode pair is separated by a 10 ml thick asbestos matrix 22 saturated with 30% potassium hydroxide electrolyte. Adjacent each anode is a 20 mil thick woven polypropylene gas screen 24. Between each stack and the cup wall is a 10 mil thick nonwoven polypropylene wick electrolyte reservoir 26, which is interrupted, to avoid gas entrapment, in four places by cutout channels 30, as illustrated in the diagrammatic sectional view of the stack taken at line 3—3 of FIG. 2, shown in FIG. 3.

Each stack is connected in series to the stack below it via a cylindrical nickel interconnection pin 14 inserted into cylindrical nickel casings 13. One set of pins connects the anodes 18 via tab connections 19 and a hollow connector rod 15, and, on the opposite inner surface of the stack, the other set connects the cathodes 20 via tab connections 17 (shown in FIG. 3) and a hollow connector rod 15. Teflon-coated baffles 28, integral with the interconnection pins, are interposed between stacks. The anode interconnection pins form a bus connection to the negative terminal, and the cathode interconnection pins form a bus connection to the positive terminal.

The end pressure plates and the interconnection pins together provide sufficient strength and integrity to the stack to obviate additional reinforcement such as connections between the stacks and the pressure vessel inner wall. This permits the inner vessel wall and the outer cup surfaces to be positioned relative to each other as shown in FIG. 1: the gap between vessel and cups, like the gap between overlapping cup areas, is large enough to allow gas to enter the stacks, but small enough to inhibit electrolyte bridging.

Use

The battery shown in FIG. 1 operates chemically in the manner described in Holleck U.S. Pat. No. 4,127,703 supra. However, the battery described herein, because it contains a number of electrode stacks in series within one pressure vessel, generates a much higher voltage which is maintained for prolonged periods of time, and under adverse physical conditions (e.g., high temperature and zero gravity). High voltage is maintained owing to the features, described above, which inhibit electrolyte bridging between stacks, which would otherwise tend to shunt current, causing a voltage drop. The connecting pin baffles also aid in inhibiting bridging.

The narrow spaces between cups also provide for essentially individual oxygen and water vapor management for each stack. This arrangement advantageously eliminates electrolyte transfer from one stack to another via H₂O electrolysis and oxygen recombination in a different stack. The arrangement also effectively prevents the potentially harmful evaporation-condensation reactions which could otherwise occur were one stack to reach overcharge while others were still charging.

Electrolyte management is also solved individually in each stack. The wick electrolyte reservoir which surrounds the electrodes of each stack provides a reserve of electrolyte and also equilibrates water and electrolyte within the stack.

The eliptical domes provide for lower common hydrogen volume than would semicircular domes, as well as for shorter terminal leads. The opposite terminals also advantageously allow short leads, as well as contributing to uniform vessel heating and uniform current distribution.

OTHER EMBODIMENTS

Other embodiments are within the following claims. For example, as was mentioned above the gap can be formed between a cup bottom and the cover of the subadjacent cup. Also, although nickel and hydrogen are preferred, other combinations can be used, e.g., silver/hydrogen and zinc/oxygen. Also, although it is preferred that stacked electrode pairs be oriented so that anodes and cathodes alternate, a back-to-back cathode arrangement may also be used. Further, electrodes may be of any suitable shape, e.g., disc-shaped with flattened edges along which electrical connections can run.

What is claimed is:

1. A metal/gas battery comprising
a pressure vessel containing gas under pressure, and within said pressure vessel, a plurality of electrode stacks, each said stack comprising an electrolyte and at least one anode/cathode pair and being contained in a cup,
each said cup comprising
a bottom portion and
an uninterrupted side wall contiguous with said bottom portion,
said cups being stacked such that, between each pair of adjacent cups, a gap is formed, said cups having hydrophobic surfaces along said gap, said gap being sufficiently large so as to allow said gas in said pressure vessel to enter each said stack, and sufficiently small so as to inhibit electrolyte bridging.

2. The battery of claim 1, wherein
said side wall of each said cup includes an upper region and a lower region, and
said gap is formed by an area of non-sealing overlap between said lower region of each cup wall and said upper region of the subadjacent said cup, each said cup wall having hydrophobic surfaces in said area of overlap.

3. The battery of claim 1, wherein
each said cup which is subadjacent to a stack-containing cup further comprises a cover having a hole therethrough, and
said gap is formed between the said bottom of each said cup and the said cover of the said cup subadjacent it,
each said cup bottom and said cup cover having hydrophobic surfaces along said gap.

4. The battery of claim 1, further comprising means for electrically connecting said electrode stacks in series.

5. The battery of claim 1, wherein
each said anode/cathode pair comprises at least one flat anode plate and at least one flat cathode plate, and
each said stack further comprises a wick reservoir of said electrolyte.

6. The battery of claim 4, wherein
said means for electrically connecting said electrode stacks in series comprises conductive elements attached to each said cup, said conductive elements comprising, for the lower stack of any pair of adjacent stacks,
connector means electrically connected to either the anode or the cathode elements within said stack,
a conducting member attached to said connector means, said conducting member extending below the bottom portion of said cup containing said stack, and
receiving means adapted to receive a conducting member from said upper stack, said receiving means being electrically connected to the said electrode elements within said lower stack having the opposite charge of said electrode elements connected to said connector means within said lower stack.

7. The battery of claim 1 further comprising
a pressure plate adjacent said bottom portion of said bottommost cup,
a pressure plate adjacent the uppermost surface of the uppermost said stack,
a terminal bar contacting each said pressure plate and extending outside said pressure vessel, and
means for applying pressure to at least one said pressure plate through said terminal bar contacting it.

8. The battery of claim 1, wherein
said pressure vessel further comprises a hydrophobic inner wall,
each said cup further comprises a hydrophobic outer wall surface, and
said pressure vessel inner wall and each said cup outer wall surface are adapted to form between them a gap sufficiently large so as to allow said gas in said pressure vessel to enter each said stack, and sufficiently small so as to inhibit electrolyte bridging between said stacks.

9. The battery of claim 5, wherein
said gas is hydrogen,
said pressure vessel is a cylinder,
each said anode is a disc-shaped platinum plate,
each said cathode is a disc-shaped nickel oxy hydroxide plate,
said electrolyte comprises potassium hydroxide,
said wick electrolyte reservoir comprises a porous cup having a side wall,
said battery futher comprising
a disc-shaped separator between each said anode/cathode pair, and
a disc-shaped gas diffusion screen adjacent each said anode plate.

* * * * *